United States Patent
Chen et al.

(10) Patent No.: US 10,567,299 B2
(45) Date of Patent: Feb. 18, 2020

(54) COFLOW IDENTIFICATION METHOD AND SYSTEM, AND SERVER USING METHOD

(71) Applicant: HUAWEI TECHNOLOGIES CO.,LTD., Shenzhen, Guangdong (CN)

(72) Inventors: Zhitang Chen, Shenzhen (CN); Yanhui Geng, Montreal (CA); Hong Zhang, Hong Kong (HK); Kai Chen, Hong Kong (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/127,649

(22) Filed: Sep. 11, 2018

(65) Prior Publication Data
US 2018/0375781 A1   Dec. 27, 2018

Related U.S. Application Data

(63) Continuation of application No. PCT/CN2017/076469, filed on Mar. 13, 2017.

(30) Foreign Application Priority Data

Mar. 11, 2016   (CN) .......................... 2016 1 0141226

(51) Int. Cl.
*H04L 29/06*   (2006.01)
*H04L 12/891*   (2013.01)
(Continued)

(52) U.S. Cl.
CPC .............. *H04L 47/41* (2013.01); *G06F 16/00* (2019.01); *G06N 7/005* (2013.01); *G06N 20/00* (2019.01);
(Continued)

(58) Field of Classification Search
CPC combination set(s) only.
See application file for complete search history.

(56) References Cited

U.S. PATENT DOCUMENTS 8,418,249 B1 *   4/2013   Nucci ................... G06F 21/552
                                           706/20
8,682,812 B1 *   3/2014   Ranjan ................ H04L 63/1425
                                           706/12
(Continued)

FOREIGN PATENT DOCUMENTS

CN     101714952 A     5/2010
CN     102739522 A     10/2012
(Continued)

OTHER PUBLICATIONS

Mosharaf Chowdhury et al, Coflow: a networking abstraction for cluster applications. Proceedings of the 11th ACM Workshop on Hot Topics in Networks, Oct. 29-30, 2012, 6 pages.
(Continued)

*Primary Examiner* — Lakeram Jangbahadur
(74) *Attorney, Agent, or Firm* — James Anderson Harrison

(57) ABSTRACT

A coflow identification method includes: obtaining a weighted matrix by means of learning according to historical data in the network, where the weighted matrix is used to minimize a feature distance between data streams belonging to a same coflow and maximize a feature distance between data streams belonging to different coflows; computing a feature distance between any two data streams in the network according to metrics in the data stream layer data feature, the application layer data stream feature distance, the terminal aspect data feature distance, and the weighted matrix; and dividing the data streams in the network into several cluster sets by using a clustering algorithm and
(Continued)

according to the feature distance between the any two data streams in the network, where each of the several cluster sets is a coflow.

9 Claims, 7 Drawing Sheets

(51) Int. Cl.
- *G06F 16/00* (2019.01)
- *G06N 7/00* (2006.01)
- *G06N 20/00* (2019.01)
- *H04L 12/851* (2013.01)
- *H04L 12/927* (2013.01)

(52) U.S. Cl.
CPC .......... *H04L 29/06* (2013.01); *H04L 47/2441* (2013.01); *H04L 47/803* (2013.01); *H04L 69/22* (2013.01)

(56) References Cited

U.S. PATENT DOCUMENTS

2010/0080133 A1* 4/2010 Oron .............. H04L 47/10
370/252

2015/0180890 A1* 6/2015 Ronen ................. H04L 63/1416
726/23

FOREIGN PATENT DOCUMENTS

| | | |
|---|---|---|
| CN | 105227488 A | 1/2016 |
| WO | 2008056349 A2 | 5/2008 |

OTHER PUBLICATIONS

Mosharaf Chowdhury, Ion Stoica, Aalo Efficient Coflow Scheduling Without Prior Knowledge. 08192015-v2, 30 pages.

Mosharaf Chowdhury et al, Efficient Coflow Scheduling with Varys. SIGCOMM'14, Aug. 17-22, 2014, Chicago, IL, USA., 12 pages.

Fahad R. Dogar et al, Decentralized Task-Aware Scheduling for Data Center Networks. SIGCOMM'14, Aug. 17-22, 2014, Chicago, IL, USA, vol. 44 Issue 4, Oct. 2014, pp. 431-442.

Jianbo Shi et al, Normalized Cuts and Image Segmentation. IEEE Transactions on Pattern Analysis and Machine Intelligence, vol. 22, No. 8, Aug. 2000, 18 pages.

Mosharaf Chowdhury:"Coflow:A Networking Abstraction for Distributed Data-Parallel Applications", Jan. 1, 2015, XP055529431, 188 pages.

* cited by examiner

COFLOW IDENTIFICATION METHOD AND SYSTEM, AND SERVER USING METHOD

CROSS-REFERENCE TO RELATED APPLICATIONS

This application is a continuation of International Application No. PCT/CN2017/076469, filed on Mar. 13, 2017, which claims priority to Chinese Patent Application No. 201610141226.2, filed on Mar. 11, 2016. The disclosures of the aforementioned applications are hereby incorporated by reference in their entireties.

TECHNICAL FIELD

The present application relates to the data processing field in communications networks, and in particular, to a coflow identification method and system, and a server using the method.

BACKGROUND

Wide application of an emerging network parallel technology is accompanied with an emergence of a new computer network concept, that is, a coflow. The coflow is defined as a set of data streams that are in a semantic relationship or a correlation relationship. Because data streams in a coflow usually belong to a same task, the coflow has a consistent requirement for network service performance, that is, a completion time of a latest data stream is minimized or the data streams in the coflow need to be transmitted within a same time limit.

The emergence of the coflow concept brings both a tremendous opportunity and an overwhelming challenge to a network service. The opportunity is that an existing network scheduling algorithm usually uses a data stream as a unit, but the scheduling algorithm using a data stream as a unit does not fully use a semantic relationship between data streams. Consequently, scheduling performed based on a stream can optimize only a performance indicator of a stream layer, but cannot play an effective role in a cluster computing scenario. This is because in the cluster computing application scenario, the computing task can enter a next step only when data streams belonging to a same computing task all arrive at a destination terminal. Therefore, by means of the scheduling algorithm that uses a data stream as a unit and in which a semantic relationship between data streams is not considered, previous several data streams belonging to a same task may be extremely quickly transmitted, but an extremely long delay may occur in a transmission process of the last data stream. In this case, from the perspective of a terminal application, network service quality is extremely poor. If a synergistic relationship between data streams is considered and all data streams in a coflow are scheduled as a whole in the scheduling algorithm, it can be ensured that data streams belonging to a same task can be transmitted within a proper time interval, so as to ensure that computation of the terminal application can enter a next phase in time.

However, the challenge brought by the emergence of the coflow is that coflow information usually cannot be directly and explicitly obtained from a header of a data stream. This is because a terminal application that generates the data stream usually does not provide any explicit information in the header of the data stream for coflow identification.

Currently, in an existing technical solution, a correlation relationship between active data streams in a network is identified in a clustering manner. In this solution, a kernel of a terminal application that generates the data streams does not need to be modified, and the terminal application does not need to explicitly provide any information about a coflow or a task aspect to a network provider. On the contrary, the technical solution is based on the following principle: Data streams belonging to a same coflow are usually sent at extremely close time points. In the technical solution, the sending time point of the data stream is extracted as a feature, data streams are clustered by using a k-means algorithm, and then the data streams in the network are scheduled by using a scheduling algorithm and according to coflow information obtained by means of clustering, so that service performance of the network is improved. However, the network generates data streams extremely frequently, even within an extremely short unit time, for example, within one second, a small data center may generate tens of thousands of data streams, and these data streams may not belong to a same coflow. Therefore, if a sending time point of a data stream is used as a unique feature, clustering accuracy may be extremely low. This is because in this solution, data streams that are not in any semantic relationship may be classified into a same coflow just because sending time points of these data streams are extremely close.

SUMMARY

Embodiments of the present application provide a coflow identification method and system, and a server using the method, so as to effectively improve accuracy of coflow identification without modifying a kernel of an application, thereby improving time validity of the coflow identification and satisfying a real-time requirement of network scheduling.

According to a first aspect, a coflow identification method is provided, where the method is used to identify a coflow in a data transmission process in a network, and the method includes: obtaining, by a server, header information of data streams in data transmission in the network;

obtaining a stream layer data feature, an application layer data stream feature, and a terminal aspect data feature according to the header information of the data streams, where the data stream layer data feature includes at least one of a sending time interval metric, a packet length average metric, a packet length variance metric, a packet arrival time interval average metric, a packet arrival time interval variance metric, or a transmission protocol distance metric; the application layer data stream feature includes an application layer data stream feature distance, where the application layer data stream feature distance is used to indicate a degree of aggregation between destination addresses or destination ports in the data transmission or a degree of overlapping between data transmit end IP address sets; and the terminal aspect data feature includes a terminal aspect data feature distance, where the terminal aspect data feature distance is used to indicate whether the data streams belong to a same terminal cluster;

obtaining a weighted matrix by means of learning according to historical data in the network, where the weighted matrix is used to minimize a feature distance between data streams belonging to a same coflow and maximize a feature distance between data streams belonging to different coflows, and the feature distance is a weighted distance of at least two of the application layer data stream feature distance, the terminal aspect data feature distance, or the metrics in the data stream layer data feature;

computing a feature distance between any two data streams in the network according to the metrics in the data stream layer data feature, the application layer data stream feature distance, the terminal aspect data feature distance, and the weighted matrix; and dividing the data streams in the network into several cluster sets by using a clustering algorithm and according to the feature distance between the any two data streams in the network, where a feature distance between any data stream in each aggregation flow and any other data stream in the same aggregation flow is less than a feature distance between the data stream and any data stream in a different aggregation flow, and each of the several cluster sets is a coflow.

With reference to the first aspect, in a first implementation of the first aspect, the header information of the data streams includes source IP addresses of the data streams, source ports of the data streams, destination IP addresses of the data streams, destination ports of the data streams, sending time points of the data streams, and transmission protocols used by the data streams.

The data features in this embodiment of this application may be extracted according to the header information of the data streams, so that the coflow identification method is applicable to most existing network systems.

With reference to the first aspect or the first implementation of the first aspect, in a second implementation of the first aspect, the sending time interval metric is an absolute value of a difference between sending time points of two data streams; the packet length average metric is an absolute value of a difference between packet length averages of two data streams; the packet length variance metric is an absolute value of a difference between packet length variances of two data streams; the packet arrival time interval average metric is an absolute value of a difference between packet transmission arrival time interval averages of two data streams; the packet arrival time interval variance metric is an absolute value of a difference between packet transmission time interval variances of two data streams; and the transmission protocol distance metric indicates whether packet transmission protocols are the same, and if the packet transmission protocols are the same, the transmission protocol distance metric is a non-zero constant, or if the packet transmission protocols are different, the transmission protocol distance metric is zero.

In this embodiment of this application, the coflow is computed and identified by quantifying the features, so that automation and intelligence of data processing are improved.

With reference to the first aspect or the first implementation of the first aspect or the second implementation of the first aspect, in a third implementation of the first aspect, the obtaining a weighted matrix by means of learning according to historical data in the network includes: obtaining a multi-dimensional feature distance vector according to the historical data in the network, where the multi-dimensional feature distance vector includes at least two dimensions, the at least two dimensions correspondingly include at least two of the sending time interval metric, the packet length average metric, the packet length variance metric, the packet arrival time interval average metric, the packet arrival time interval variance metric, the transmission protocol distance metric, the application layer data stream feature distance, or the terminal aspect data feature distance, and each metric or each feature distance forms a dimension of the multi-dimensional feature distance vector; and obtaining a weighted matrix of the multi-dimensional feature distance vector by means of learning according to the historical data in the network, so as to allocate different weights by using a learning mechanism and according to different roles that feature distances of different dimensions play in coflow identification, to minimize a feature distance between data streams belonging to a same coflow and maximize a feature distance between data streams belonging to different coflows.

With reference to any one of the first aspect or the foregoing three implementations of the first aspect, in a fourth implementation of the first aspect, the computing a feature distance between any two data streams in the network according to the metrics in the data stream layer data feature, the application layer data stream feature distance, the terminal aspect data feature distance, and the weighted matrix includes: computing the feature distance between the any two data streams in the network according to the multi-dimensional feature distance vector and the weighted matrix.

With reference to any one of the first aspect or the foregoing four implementations of the first aspect, in a fifth implementation of the first aspect, the obtaining a weighted matrix of the multi-dimensional feature distance vector by means of learning according to the historical data in the network includes:

dividing historical data streams in the network into two data stream pair sets according to whether the historical data streams belong to a same coflow, where the two data stream pair sets respectively correspond to a coflow data set and a non-coflow data set; and finding a positive semi-definite matrix A that minimizes a computation result of a target function $$\min_{A} \sum_{(f_i,f_j)\in S} \|f_i - f_j\|_A^2 - \log\left(\sum_{(f_i,f_j)\in D} \|f_i - f_j\|_A\right)$$

s.t. $A \phi 0$, where $\|f_i - f_j\|_A$ represents a feature distance between any two data streams, $\|f_i - f_j\|_A = \sqrt{D(i,j)^T A D(i,j)}$ is a weighted distance of at least two of the application layer data stream feature distance, the terminal aspect data feature distance, or the metrics in the data stream layer data feature, $D(i, j)$ is the multi-dimensional feature distance vector, $D(i, j)^T$ is a transposed matrix of the multi-dimensional feature distance vector, and A is a weighted matrix.

A second aspect provides a server, where the server includes an information obtaining module, a feature extraction module, a weight learning module, a feature distance computation module, and a coflow clustering module, where the information obtaining module is configured to obtain header information of data streams in data transmission in a network and historical data in the network;

the feature extraction module is configured to extract a stream layer data feature, an application layer data stream feature, and a terminal aspect data feature from the header information of the data streams;

the weight learning module is configured to obtain a weighted matrix by means of learning according to the historical data in the network, where the weighted matrix is used to minimize a feature distance between data streams belonging to a same coflow and maximize a feature distance between data streams belonging to different coflows, and the feature distance is a weighted distance of the data stream layer data feature, the application layer data stream feature, and the terminal aspect data feature; and the feature distance computation module is configured to compute a feature distance between any two data streams in the network according to metrics in the data stream layer data feature, the application layer data stream feature distance, the terminal aspect data feature distance, and the weighted matrix; and the coflow clustering module is configured to divide the data streams in the network into several cluster sets by using a clustering algorithm and according to the feature distance between the any two data streams in the network, where a feature distance between any data stream in each aggregation flow and any other data stream in the same aggregation flow is less than a feature distance between the data stream and any data stream in a different aggregation flow, and each of the several cluster sets is a coflow.

A third aspect provides a server, including a receive port, a processor, and a memory, where the receive port is configured to receive header information of data streams in data transmission in a network;

the processor is configured to: obtain a stream layer data feature, an application layer data stream feature, and a terminal aspect data feature according to the header information of the data streams; obtain a weighted matrix by means of learning according to historical data in the network; compute a feature distance between any two data streams in the network according to metrics in the data stream layer data feature, the application layer data stream feature distance, the terminal aspect data feature distance, and the weighted matrix; and finally, divide the data streams in the network into several cluster sets by using a clustering algorithm and according to the feature distance between the any two data streams in the network, where each of the several cluster sets is a coflow; and the memory is configured to store the stream layer data feature, the application layer data stream feature, the terminal aspect data feature, the historical data in the network, and the weighted matrix.

With reference to the third aspect, in a first implementation of the third aspect, the data stream layer data feature includes at least one of a sending time interval metric, a packet length average metric, a packet length variance metric, a packet arrival time interval average metric, a packet arrival time interval variance metric, or a transmission protocol distance metric; the application layer data stream feature includes the application layer data stream feature distance, where the application layer data stream feature distance is used to indicate a degree of aggregation between destination addresses or destination ports in the data transmission or a degree of overlapping between data transmit end IP address sets; and the terminal aspect data feature includes the terminal aspect data feature distance, where the terminal aspect data feature distance is used to indicate whether the data streams belong to a same terminal cluster.

With reference to the third aspect or the first implementation of the third aspect, in a second implementation of the third aspect, the weighted matrix is used to minimize a feature distance between data streams belonging to a same coflow and maximize a feature distance between data streams belonging to different coflows, and the feature distance is a weighted distance of at least two of the application layer data stream feature distance, the terminal aspect data feature distance, or the metrics in the data stream layer data feature.

A fourth aspect provides a coflow identification apparatus, configured to identify a coflow in a data transmission process in a network, where the apparatus includes:

an information obtaining module, configured to obtain header information of data streams in data transmission in a network and historical data in the network;

a feature extraction module, configured to obtain a stream layer data feature, an application layer data stream feature, and a terminal aspect data feature according to the header information of the data streams, where the data stream layer data feature includes at least one of a sending time interval metric, a packet length average metric, a packet length variance metric, a packet arrival time interval average metric, a packet arrival time interval variance metric, or a transmission protocol distance metric; the application layer data stream feature includes an application layer data stream feature distance, where the application layer data stream feature distance is used to indicate a degree of aggregation between destination addresses or destination ports in the data transmission or a degree of overlapping between data transmit end IP address sets; and the terminal aspect data feature includes a terminal aspect data feature distance, where the terminal aspect data feature distance is used to indicate whether the data streams belong to a same terminal cluster;

a weight learning module, configured to obtain a weighted matrix by means of learning according to the historical data in the network, where the weighted matrix is used to minimize a feature distance between data streams belonging to a same coflow and maximize a feature distance between data streams belonging to different coflows, and the feature distance is a weighted distance of at least two of the application layer data stream feature distance, the terminal aspect data feature distance, or the metrics in the data stream layer data feature;

a feature distance computation module, configured to compute a feature distance between any two data streams in the network according to the metrics in the data stream layer data feature, the application layer data stream feature distance, the terminal aspect data feature distance, and the weighted matrix; and a clustering module, configured to divide the data streams in the network into several cluster sets by using a clustering algorithm and according to the feature distance between the any two data streams in the network, where a feature distance between any data stream in each aggregation flow and any other data stream in the same aggregation flow is less than a feature distance between the data stream and any data stream in a different aggregation flow, and each of the several cluster sets is a coflow.

With reference to the fourth aspect, in a first implementation of the fourth aspect, the weight learning module is further configured to: obtain a multi-dimensional feature distance vector according to the historical data in the network, where the multi-dimensional feature distance vector includes at least three dimensions, the at least three dimensions include the application layer data stream feature distance, the terminal aspect data feature distance, and at least one of the sending time interval metric, the packet length average metric, the packet length variance metric, the packet arrival time interval average metric, the packet arrival time interval variance metric, or the transmission protocol distance metric, and each metric or each feature distance forms a dimension of the multi-dimensional feature distance vector; and then obtain a weighted matrix of the multi-dimensional feature distance vector by means of learning according to the historical data in the network, so as to allocate different weights by using a learning mechanism and according to different roles that feature distances of different dimensions play in coflow identification, to minimize a feature distance between data streams belonging to a same coflow and maximize a feature distance between data streams belonging to different coflows.

A fifth aspect provides a coflow identification system, including the server according to any implementation of the second, the third, and the fourth aspects and a slave server, where the slave server includes one or more stream information screening modules, and each stream information screening module is configured to: obtain header information of data streams of at least one terminal, and send the header information of the data streams to the server.

According to the foregoing coflow identification method, system, and apparatus, an effective eigenvector is extracted for behavior modes of different aspects of a terminal, an application, and generated data streams. The eigenvector includes a terminal cluster, a data sending path of the application, and stream microscopic behavior modes such as a sending time point of the data stream and a sending time interval of the data streams, so as to provide comprehensive and effective information for coflow identification. The eigenvector is constructed by using these features to provide important input for the clustering algorithm, and then a weight of a feature of each dimension in the eigenvector is learned according to training data and depending on different roles that the features play in the coflow identification, to improve accuracy of the coflow identification.

DESCRIPTION OF EMBODIMENTS

The technical solutions of the present application are further described in detail below by using the accompanying drawings and embodiments.

The present application mainly relates to how to identify, in real time without modifying a kernel of an application of a terminal and by using a clustering method according to features of data streams and behavior features of the application and the terminal that generate the data streams, a coflow to which the data streams in the network belong.

For example, for behavior modes of different aspects of the terminal, the application, and the generated data streams, an effective eigenvector is extracted. The eigenvector includes a terminal cluster mode, a data sending mode of the application, and stream microscopic behavior modes such as a sending time point of the data stream and a sending time interval of the data streams, so as to provide comprehensive and effective information for coflow identification, thereby performing coflow identification by extracting features from three different modes or aspects. In addition, in the present application, a weight corresponding to a feature of each dimension is automatically learned by using training data. The data streams are clustered by using a clustering algorithm and according to the obtained features of different aspects and corresponding weights, so as to obtain synergistic information of the data streams in the network.

The present application mainly includes the following features: Using of features of three aspects is provided, including extracting effective features from a terminal cluster mode, an application sending mode, and a stream microscopic behavior mode, to construct an eigenvector as important input for a clustering algorithm; a weight of a feature of each dimension in the eigenvector is automatically learned according to training data, to improve accuracy of coflow identification; and online clustering is implemented on data streams in a network by using the clustering algorithm and the obtained eigenvector and weights, to obtain coflow information.

Embodiment 1

Figure 1:
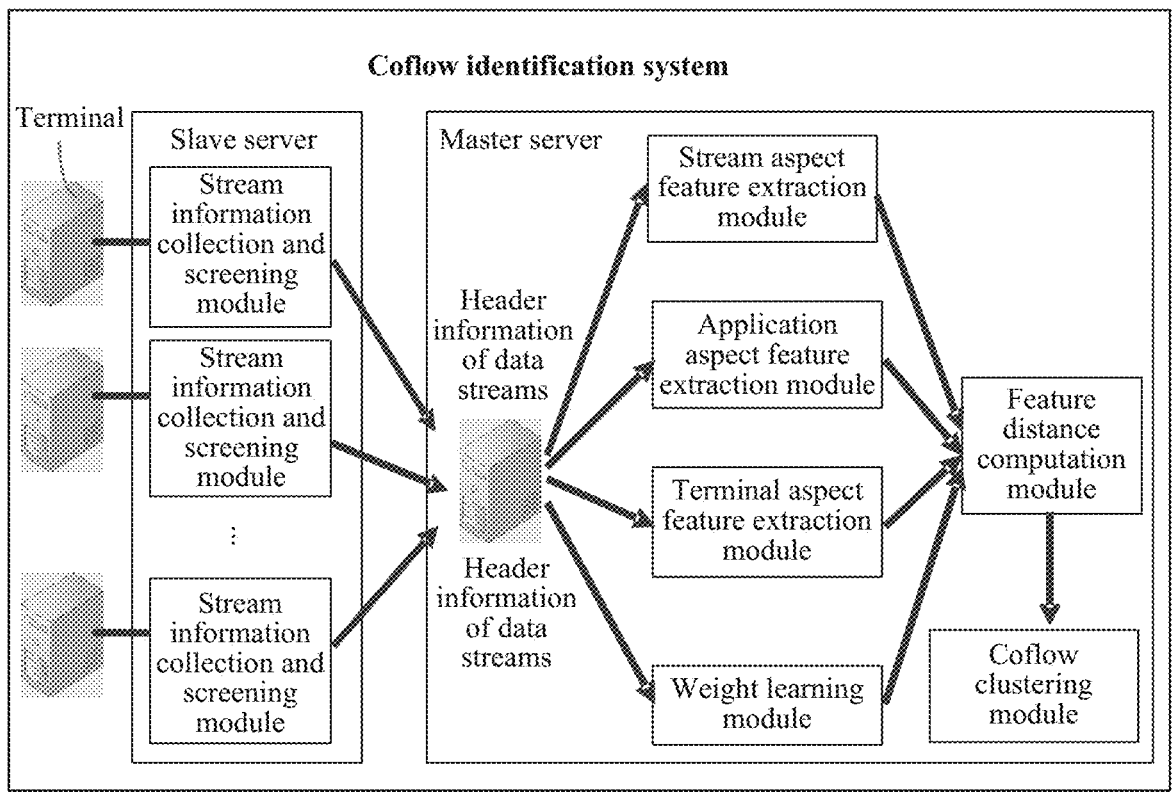
FIG. 1 is a schematic diagram of a coflow identification system according to an embodiment of the present application.

As shown in FIG. 1, this embodiment of the present application relates to a coflow identification method that is used to identify a coflow in a data transmission process in a network. The network used for data transmission mainly includes a terminal, a slave server, and a master server.

The slave server includes one or more stream information screening modules. Each stream information screening module corresponds to a terminal and is configured to: collect data stream information of the terminal, and transmit the collected data stream information to the master server by adding the collected data stream information to header information of data streams in the data transmission in the network.

In some embodiments, there may be no slave server, and the stream information screening module may be directly disposed on the master server.

The master server includes a stream layer data feature extraction module, an application layer data stream feature extraction module, a terminal aspect data feature extraction module, a weight learning module, a feature distance computation module, and a coflow clustering module.

The master server extracts, by using the stream layer data feature extraction module, the application layer data stream feature extraction module, and the terminal aspect data feature extraction module, a corresponding stream layer data feature, a corresponding application layer data stream feature, and a corresponding terminal aspect data feature from the header information of the data streams that is sent by the slave server.

Figure 2:
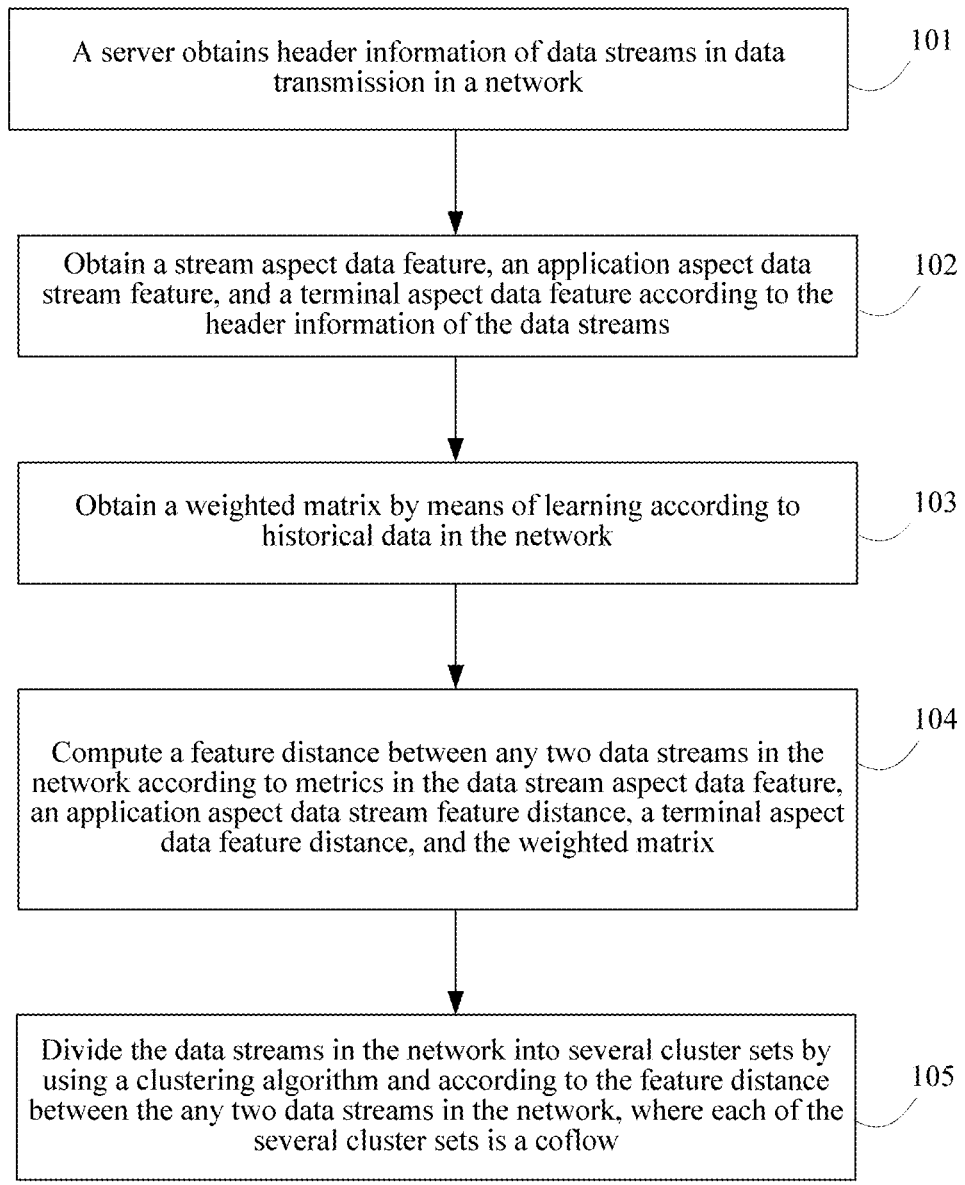
FIG. 2 is a schematic flowchart of a coflow identification method according to Embodiment 1 of the present application.

In addition, referring to FIG. 2, this embodiment of the present application relates to a coflow identification method. The method includes the following five steps 101 to 105.

Step 101: A server obtains header information of data streams in data transmission in a network.

The server may obtain the header information of the data streams by directly capturing data transmitted in the network, or may obtain the header information of the data streams by using a stream information collection module in a slave server or a terminal.

The stream information collection module extracts packet header information of a new data stream when the data stream arrives. Features that are critical to a coflow include a source IP address, a source port (Server Port), a destination IP address, and a destination port (Client Port) of the data stream, a sending time point (Start Time) of the data stream, and a transmission protocol used by the data stream. Then, the stream information collection module sends the obtained information to the server.

The information is collected because there may be some user behavior modes in the network. For example, a group of data streams using a particular transmission protocol may be regularly sent from some source IP addresses to some destination IP addresses by using some ports. These data streams may belong to a coflow of a same task.

The stream information collection and screening module further performs preliminary screening on the data streams, to screen out a data stream that has been transmitted and a data stream that uses a TCP (Transmission Control Protocol), and regularly reports data stream information obtained by means of collection and screening to a master server system.

Step 102: Obtain a stream layer data feature, an application layer data stream feature, and a terminal aspect data feature according to the header information of the data streams, where the data stream layer data feature includes at least one of a sending time interval metric, a packet length average metric, a packet length variance metric, a packet arrival time interval average metric, a packet arrival time interval variance metric, or a transmission protocol distance metric; the application layer data stream feature includes an application layer data stream feature distance, where the application layer data stream feature distance is used to indicate a degree of overlapping between destination addresses or destination ports in the data transmission or a degree of overlapping between data transmit end IP address sets; and the terminal aspect data feature includes a terminal aspect data feature distance, where the terminal aspect data feature distance is used to indicate whether the data streams belong to a same terminal cluster, and the terminal cluster is a set including at least one terminal having a common attribute or feature.

The sending time interval metric in the stream layer data feature is an absolute value of a difference between sending time points of two data streams.

Because data streams in a coflow belong to a same task, the data streams are usually sent approximately simultaneously, to successfully complete the task. Therefore, an important method for determining whether two data streams belong to a same coflow is measuring a difference between sending time points of the two data streams. For example, time stamps $S_{i,time}$ and $S_{j,time}$ are separately extracted from packet headers of two active data streams. Because the sending time point is a simple integer variable, the sending time interval metric may be defined as an absolute value of a difference between two sending time points.

A step of obtaining the sending time interval metric in the stream layer data feature according to the header information of the data streams is as follows:

The sending time interval metric $D_t(S_{i,time}, S_{j,time}) = |S_{i,time} - S_{j,time}|$, where $S_{i,time}$ and $S_{j,time}$ are sending time points of two data streams.

The packet length average metric in the stream layer data feature is an absolute value of a difference between packet length averages of two data streams. The packet length variance metric in the stream layer data feature is an absolute value of a difference between packet length variances of two data streams.

Because data streams belonging to a same coflow are generated by a same application in many scenarios, packet lengths of these data streams need to conform to a similar probability distribution. Therefore, in a stream layer data feature extraction module, a packet length average and a packet length variance of a data stream are extracted:

a packet length average of a data stream:

$$M_{i,size} = \frac{1}{N_i} \sum_{j=1}^{N_i} l_{ij};$$

and a packet length variance of a data stream:

$$V_{i,size} = \frac{1}{N_i - 1} \sum_{j}^{N_i} (l_{ij} - M_{i,size})^2;$$

where $N_i$ represents a quantity of packets of a data stream i, and $l_{ij}$ represents a length of a $j^{th}$ to packet of the data stream i.

A distance between packet length averages of any two active data streams and a distance between packet length variance metrics of any two active data streams may be computed according to computed packet length averages and packet length variances of the data streams:

the packet length average metric: $D_{msize}(i,j) = |M_{i,size} - M_{j,size}|$; and the packet length variance metric: $D_{vsize}(i,j) = |V_{i,size} - V_{j,size}|$.

The packet arrival time interval average metric is an absolute value of a difference between packet transmission arrival time interval averages of two data streams. The packet arrival time interval variance metric is an absolute value of a difference between packet arrival time interval variances of two data streams.

Similarly, because data streams in a coflow are generated by a same application in most cases, packet transmission time intervals of these data streams also need to conform to a similar probability distribution. Therefore, a packet transmission time interval average and a packet transmission time interval variance of a data stream are computed first:

the packet arrival time interval average metric:

$$M_{i,int} = \frac{1}{N_i - 1} \sum_{j=1}^{N_i - 1} \Delta t_{i,j};$$

and
the packet transmission time interval variance metric:

$$V_{i,int} = \frac{1}{N_i - 2} \sum_{j=1}^{N_i-1} (\Delta t_{ij} - M_{i,int})^2;$$

where $\Delta t_{ij}$ represents a $j^{th}$ time interval of an $i^{th}$ data stream.

Similarly, a distance between packet arrival time intervals of any two active data streams is computed as follows:

the packet arrival time interval average metric: $D_{mint}(i, j) = |M_{i,int} - M_{j,int}|$; and the packet arrival time interval variance metric: $D_{vint}(i, j) = |M_{i,int} - M_{j,int}|$.

The transmission protocol distance metric indicates whether packet transmission protocols are the same. If the packet transmission protocols are the same, the transmission protocol distance metric is a non-zero constant, and if the packet transmission protocols are different, the transmission protocol distance metric is zero.

Data of data streams in a same coflow are usually transmitted by using a same transmission protocol, especially, the TCP protocol. For example, in data streams in the entire network, there are N different transmission protocols in total, for example, Prtcl=$\{p_1, p_2, \wedge p_N\}$, and an N-dimensional 0-1 vector variable may be used to represent a protocol used by a particular data stream. When the data stream uses an $i^{th}$ transmission protocol, an $i^{th}$ dimension of the vector is 1 and other dimensions are 0. For example, in the following example, if the data stream uses the second transmission protocol, $$Pr_i = \begin{bmatrix} 0 \\ 1 \\ M \\ 0 \end{bmatrix},$$

and a distance metric of two protocols is defined as: $D_{prtcl}(i, j) = \|Pr_i - Pr_j\|_2$.

Therefore, a value of the distance metric of the two protocols is 0 or $\sqrt{2}$.

The application layer data stream feature includes the application layer data stream feature distance. The following describes how to specifically extract the application layer data stream feature and how to compute the application layer data stream feature distance.

The application layer data stream feature mainly reflects a behavior mode feature of an application that generates a data stream. This plays an important role in coflow identification. Some priori knowledge may be obtained by analyzing an application that is most likely to generate a coflow, for example, the coflow is more likely to be an aggregation flow. Data streams not belonging to a same aggregation flow may belong to a same coflow. Data streams not belonging to a same aggregation flow in a parallel computing application usually have a feature that these data streams all come from some common terminals. Therefore, the application layer data feature extraction module identifies an aggregation flow, measures a degree of overlapping between terminals by using a Jacard similarity, and defines a feature distance between any two data streams in an application layer according to aggregation flow information and the Jacard similarity.

The application layer feature distance is mainly computed in the following four steps:

Step 1: Cluster the data streams according to source IP addresses and find all aggregation flows $\{Agg_k\}$ in the network.

Step 2: Find a source IP address set $\{Src_k\}$ of the aggregation flows.

Step 3: For data streams belonging to a same aggregation flow, directly assign a value to the application layer feature distance.

Step 4: For data streams not belonging to a same aggregation flow, compute a Jacard similarity and compute the application layer feature distance.

A principle of computing the application layer feature distance is that in a parallel computing application such as Spark, one reduce node may process data from multiple map nodes. Therefore, if two data streams have consistent destination IP addresses and consistent destination ports, a probability that the data streams belong to a same coflow is relatively high.

By means of behavior analysis on the application such as Spark on a MapReduce computing platform, in a computing start phase, a Sparkcontext object starts executors on different computing nodes, and allocates tasks to different executors. Each executor establishes its own link manager and allocates a fixed port number to the link manager. In a reduce phase, the executor needs to obtain data from another executor, so that a link is established between the current executor and the another executor by using the link manager. Therefore, the another executor sends data to a special port of an executor that executes a reduce task. Therefore, data streams that have consistent destination addresses and consistent destination ports are defined as an aggregation flow. If two data streams belong to a same aggregation flow, a probability that the data streams belong to a same coflow is relatively high. Therefore, the first step is to find an aggregation flow of the data streams in the network, as shown in the following formula:

$f_i \in Agg_k$, if $f_{i,dst\_IP} = Agg_{k,dst\_IP}$ && $f_{i,dst\_port} = Agg_{k,dst\_port}$, where $f_i$ is a data stream, $Agg_k$ is an aggregation flow, $f_{i,dst\_IP}$ and $f_{i,dst\_port}$ represent a destination address and a destination port of the data stream, and $Agg_{k,dst\_port}$ represents a destination address and a destination port of a data stream in the aggregation flow.

After the aggregation flow is computed, when an application layer feature distance of any two active data streams needs to be computed, if the two data streams belong to a same aggregation flow, a probability that the data streams belong to a same coflow is quite high, that is, the application layer feature distance between the data streams is quite small, and 0 is assigned to the feature distance. However, two data streams not belonging to a same aggregation flow need to be treated differently. If a degree of overlapping between transmit end IP address sets of the data streams is quite high, a probability that the data streams belong to a same coflow is still quite high; otherwise, the probability that the data streams belong to a same coflow is quite low.

Figure 3A:
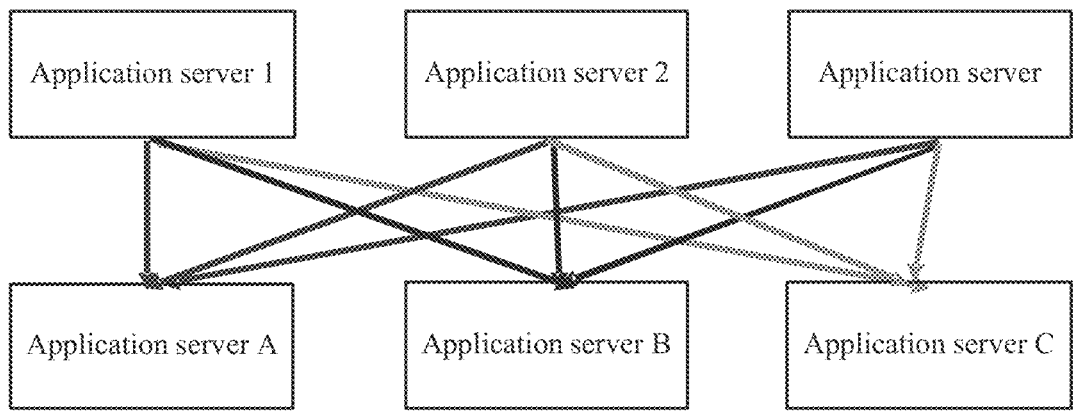
FIG. 3A and FIG. 3B are schematic diagrams of communication modes of an aggregation flow according to Embodiment 1 of the present application.
Figure 3B:
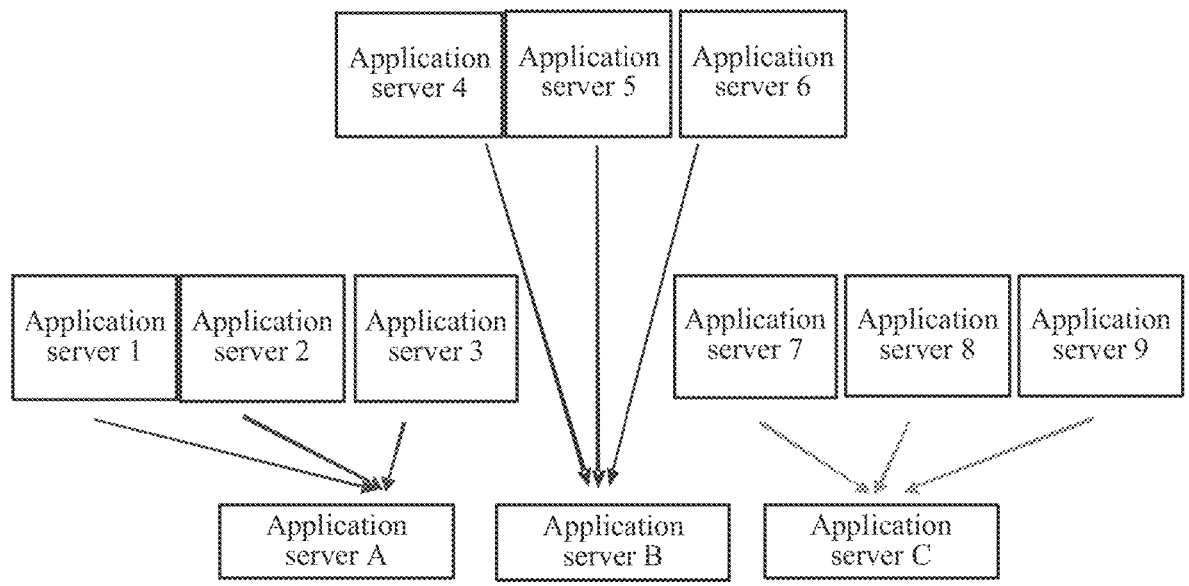

According to the foregoing analysis, the following formula for computing an application layer feature distance is obtained:

$$D_{app}(i,j) = \begin{cases} 0 & \text{if } i, j \text{ in the same aggregation} \\ 1 - J(i,j) & \text{otherwise} \end{cases},$$

where $D_{app}(i, j)$ is an application layer feature distance, and $J(i, j)$ is a similarity between two data streams not belonging to a same aggregation flow. A process of computing the similarity is as follows:

As shown in FIG. 3A and FIG. 3B, data streams not belonging to a same aggregation flow may belong to a same coflow. As described above, in a MapReduce application, in a data shuffle phase, a many-to-many communication mode on a running application server usually appears.

A communication mode shown in FIG. 3A is quite common in data shuffle of MapReduce, that is, although two data streams do not belong to a same aggregation flow, these data streams are usually sent from a same transmit end set. However, a communication mode shown in FIG. 3B is not common in MapReduce. Therefore, when two data streams do not belong to a same aggregation flow, an application layer feature distance of the two data streams may be computed according to a degree of overlapping between transmit end IP address sets of the data streams.

Assuming that transmit end IP address sets of aggregation flows to which a data stream i and a data stream j belong are respectively $\{src_i\}$ and $\{src_j\}$, a degree of overlapping between the two transmit end IP address sets is provided by using the following Jacard similarity:

$$J(i,j) = |\{src_i\} I\{src_j\}|/|\{src_i\} Y\{src_j\}|, \text{ where}$$

a higher Jarcard similarity indicates a higher degree of overlapping between the transmit end IP address sets of the aggregation flows to which the two data streams belong, a higher probability that the two aggregation flows come from a same task, and a higher probability that the two aggregation flows belong to a same coflow.

A specific process of extracting and computing the terminal aspect data feature and the terminal aspect data feature distance is as follows:

A traffic matrix of a data center is usually quite sparse, that is, terminals of the data center form a cluster, and the cluster formed by the terminals may be defined as a community. Most traffic in the network is generated in a stable community. According to this network behavior mode, although there are many terminals in the network, in an actual scenario, the terminals form a cluster to some extent. This clustering phenomenon means that all terminals in the network may be divided into several communities, and traffic of the network is mainly generated by means of communication between terminals within a community. However, there is an extremely small probability that cross-community data streams can form a coflow. Therefore, if two data streams belong to a same community, a probability that the two data streams belong to a same coflow is even higher. On the contrary, if two data streams belong to two different communities, or a data stream is a cross-community data stream, a probability that the two data streams belong to a same coflow is relatively low. Therefore, a most important task of the terminal aspect feature extraction module is to find a community in the network according to historical sending behavior in the network.

Based on the foregoing analysis, the terminal aspect data feature distance is obtained in four steps:

Step 1: Periodically obtain traffic attribute information of the network, where the traffic attribute information includes at least two of a terminal traffic mode, data traffic of a terminal within a period of time, or a quantity of data streams of a terminal within a period of time.

Step 2: Construct a weighted traffic matrix according to the obtained traffic attribute information of the network, to distinguish different roles and weights of the terminal traffic mode, the data traffic of a terminal within a period of time, and the quantity of data streams of a terminal within a period of time during computation of a community, where the community is a cluster including at least two terminals, and terminals in each cluster have at least one same traffic attribute of the terminal traffic mode, the data traffic of a terminal within a period of time, or the quantity of data streams of a terminal within a period of time.

Step 3: Obtain information about the community in the network according to the weighted traffic matrix by using a spectral clustering algorithm.

Step 4: Determine, according to whether the data streams belong to a same community, a distance between any two active data streams in a community aspect in the current network.

The constructing a weighted traffic matrix and the obtaining information about the community in the network according to the weighted traffic matrix by using a spectral clustering algorithm include:

periodically obtaining data stream information of the network within a period of time T from a data stream information collection and screening module, and computing a weighted traffic matrix within the period of time, as shown in the following formula:

$$M(i,j) = V(i,j) \times N(i,j) \text{ where}$$

$M \in R^{n \times n}$ represents traffic modes of n terminals in the network, $V(i, j)$ represents traffic of any terminal pair $(i, j)$ within the period of time, and $N(i, j)$ represents a quantity of data streams of the any terminal pair $(i, j)$ within the period of time.

The information about the community is extracted according to the obtained weighted traffic matrix by using the spectral clustering algorithm, and the spectral clustering algorithm is as follows:

1. Input: Network traffic trace during the last T seconds; Construct the communication density matrix $M \in R^{n \times n}$ based on the traffic trace.
2. Construct the weighted adjacency matrix W by normalizing the communication density matrix.
3. Compute the unnormalized Laplacian $L = D - W$.
4. Compute the generalized eigenvectors $u_1, u_2, K, u_n$ and corresponding eigenvalues $v_1, v_2, \wedge, v_n$ of the generalized eigen problem $Lu = \lambda Du$.
5. Determine the number of clusters k by finding the largest eigen gap: $k = \arg\max_i(v_{i+1} - v_i)$.
6. Let $U \in R^{n \times k}$ be the matrix containing the vectors $u_1, \wedge, u_k$ as columns.
7. For $i = 1, \wedge, n$, let $y_i \in R^k$ be the vector corresponding to the i - th row of U.
8. Cluster the points $(y_i)_{i=1, \wedge, n}$ in $R^k$ with the k-means algorithm into cluster $C_1, \wedge, C_k$.
Output: Community clusters $A_1, \wedge, A_k$ with $A_i = \{j | y_j \in C_i\}$.

As described above, a coflow is usually generated within a community. A terminal aspect feature distance between any two data streams may be determined according to whether the two data streams belong to a same community:

$$D_{com}(i,j) = \begin{cases} 0 & \text{if } i, j \text{ belong to the same community} \\ 1 & \text{otherwise} \end{cases}.$$

Step 103: Obtain a weighted matrix by means of learning according to historical data in the network, where the weighted matrix is used to minimize a feature distance between data streams belonging to a same coflow and maximize a feature distance between data streams belonging to different coflows, and the feature distance is a weighted distance of at least two of the application layer data stream feature distance, the terminal aspect data feature distance, or the metrics in the data stream layer data feature. It should be particularly noted that the feature distance is a weighted distance obtained by using at least one of the metrics in the data stream layer data feature.

A step of obtaining the weighted matrix by means of learning according to the historical data in the network includes: constructing a multi-dimensional feature distance vector D(i, j) where $$D(i, j) = \begin{bmatrix} D_{time}(i, j) \\ D_{msize}(i, j) \\ D_{vsize}(i, j) \\ D_{mint}(i, j) \\ D_{vint}(i, j) \\ D_{prtcl}(i, j) \\ D_{app}(i, j) \\ D_{com}(i, j) \end{bmatrix},$$

the multi-dimensional feature distance vector includes at least two dimensions or at least three dimensions, the at least two dimensions correspondingly include at least two of the sending time interval metric $D_{time}(i, j)$, the packet length average metric $D_{msize}(i, j)$ the packet length variance metric $D_{vsize}(i, j)$, the packet arrival time interval average metric $D_{mint}(i, j)$, the packet arrival time interval variance metric $D_{vint}(i, j)$, the transmission protocol distance metric $D_{prtcl}(i, j)$ the application layer data stream feature distance $D_{app}(i, j)$, or the terminal aspect data feature distance $D_{com}(i, j)$, or the at least three dimensions include the application layer data stream feature distance, the terminal aspect data feature distance, and at least one of the sending time interval metric, the packet length average metric, the packet length variance metric, the packet arrival time interval average metric, the packet arrival time interval variance metric, or the transmission protocol distance metric, and each metric or each feature distance forms a dimension of the multi-dimensional feature distance vector; and obtaining a weighted matrix of the multi-dimensional feature distance vector by means of learning according to the historical data in the network, so as to allocate different weights by using a learning mechanism and according to different roles that feature distances of different dimensions play in coflow identification, to minimize a feature distance between data streams belonging to a same coflow and maximize a feature distance between data streams belonging to different coflows.

Learning of the weighted matrix may be run and completed in a spark application program, and the historical data in the network is obtained by collecting network trace data and collecting coflow information from the application.

First, data streams in the network trace data are divided into the following two data stream pair sets according to whether the data streams belong to a same coflow, and the two data stream pair sets respectively correspond to a coflow data set and a non-coflow data set:

$S:(f_i,f_j) \in S$ if $f_i$ and $f_j$ belong to the same coflow;

$D:(f_i,f_j) \in D$ if $f_i$ and $f_j$ belong to different coflows.

A positive semi-definite matrix A is found, to minimize the following target function:

$$\min_{A} \sum_{(f_i,f_j) \in S} \|f_i - f_j\|_A^2 - \log\left(\sum_{(f_i,f_j) \in D} \|f_i - f_j\|_A\right)$$

$$\text{s.t. } A \phi 0,$$

where $\|f_i - f_j\|_A = \sqrt{D(i,j)^T A D(i,j)}$ represents a feature distance between any two data streams, that is, a weighted distance of at least two of the application layer data stream feature distance, the terminal aspect data feature distance, or the metrics in the data stream layer data feature.

The target function indicates that an optimal weighted matrix A is found, so as to minimize a feature distance between data streams belonging to a same coflow and maximize a feature distance between data streams belonging to different coflows.

Step 104: Compute a feature distance between any two data streams in the network according to the metrics in the data stream layer data feature, the application layer data stream feature distance, the terminal aspect data feature distance, and the weighted matrix.

The foregoing step 104 specifically includes:

obtaining a multi-dimensional feature distance vector of the data streams in the data transmission in the network, where the data stream in the data transmission in the network is a real-time data stream currently transmitted in the network, the data stream is different from the historical data used for training the weighted matrix, and the historical data is past information about the data stream rather than current information about the data stream, where the multi-dimensional feature distance vector includes at least three dimensions, the at least three dimensions include the application layer data stream feature distance, the terminal aspect data feature distance, and at least one of the sending time interval metric, the packet length average metric, the packet length variance metric, the packet arrival time interval average metric, the packet arrival time interval variance metric, or the transmission protocol distance metric, and each metric or each feature distance forms a dimension of the multi-dimensional feature distance vector; and computing the feature distance $d(i, j) = \|f_i - f_j\|_A = \sqrt{D(i,j)^T A D(i,j)}$ between the any two data streams in the network according to the multi-dimensional feature distance vector and the weighted matrix.

That is, the feature distance between the any two data streams in the network is equal to a square root of a product of a transposed matrix $D(i,j)^T$ of the multi-dimensional feature distance vector, the weighted matrix A, and the multi-dimensional feature distance vector D(i, j).

A smaller feature distance between any two data streams in the network indicates a larger similarity between the two data streams, and a higher probability that the data streams belong to a same coflow.

Step 105: Divide the data streams in the network into several cluster sets by using a clustering algorithm and according to the feature distance between the any two data streams in the network, where a feature distance between any data stream in each aggregation flow and any other data stream in the same aggregation flow is less than a feature distance between the data stream and any data stream in a different aggregation flow, and each of the several cluster sets is a coflow.

A data stream set is divided into several clusters by using the clustering algorithm and according to a distance that is between any two active data streams in the network and that is output by the foregoing module. Each cluster represents coflow information. A clustering method is minimizing a distance between data streams within a cluster and maximizing a distance between data streams in different clusters.

The foregoing clustering algorithm may be implemented by using multiple clustering algorithms. For example, a clustering algorithm with the following features is used: A quantity of clusters does not need to be preset, the clustering algorithm is based on a relative distance between instances and an absolute location of the instance is not required, and a noise instance is allowed. In this embodiment of the present application, a DBSCAN clustering algorithm is preferably used.

Figure 4:
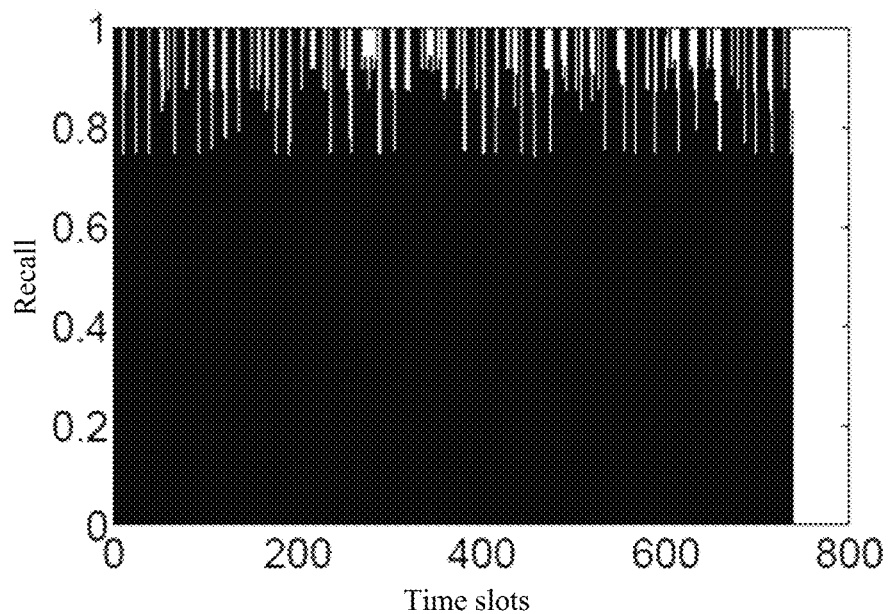
FIG. 4 is an experimental data diagram of a coflow identification effect of the coflow identification method according to Embodiment 1 of the present application.

FIG. 4 shows a situation of identifying a coflow in a network on an experimental platform by using the coflow identification method according to Embodiment 1 of the present application. A horizontal coordinate indicates time, and a vertical coordinate indicates a percentage of data streams that are identified in the coflow. Therefore, it may be learned that a coflow identification solution provided in the coflow identification method can quite accurately identify data streams that belong to a coflow.

Figure 5:
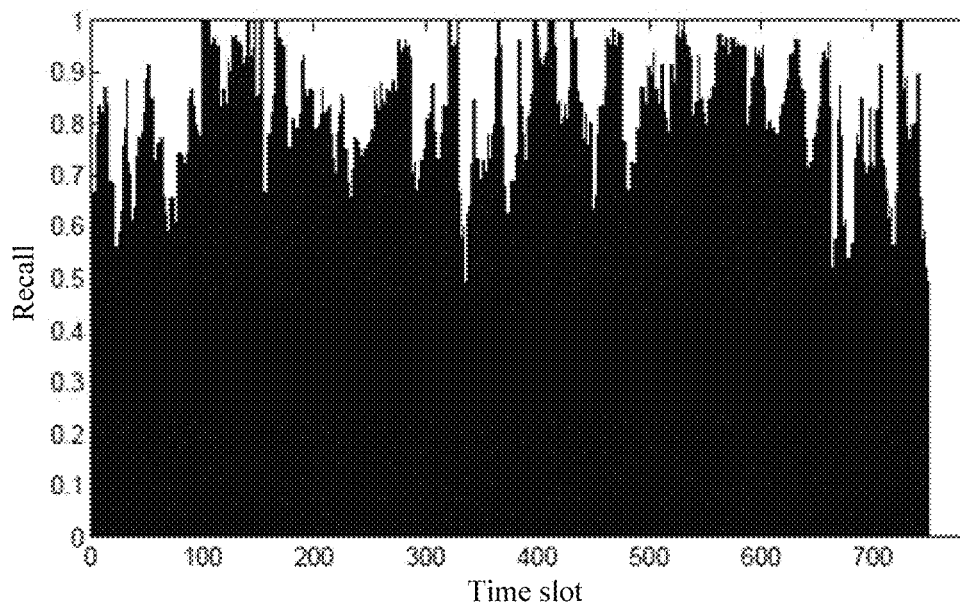
FIG. 5 is an experimental data diagram of a coflow identification effect excluding a terminal aspect data feature in the coflow identification method according to Embodiment 1 of the present application.

To prove necessity of providing different feature extraction manners and weighted matrix learning in the coflow identification method, comparison experiment is performed below. As shown in FIG. 5, FIG. 5 shows a coflow identification effect of a solution excluding a terminal aspect data feature. It may be learned from FIG. 5 that if the terminal aspect data feature is not considered, a percentage of correctly identified coflows is obviously decreased. Therefore, effectiveness and necessity of extracting the foregoing hierarchical multiple features can be proved.

Figure 6:
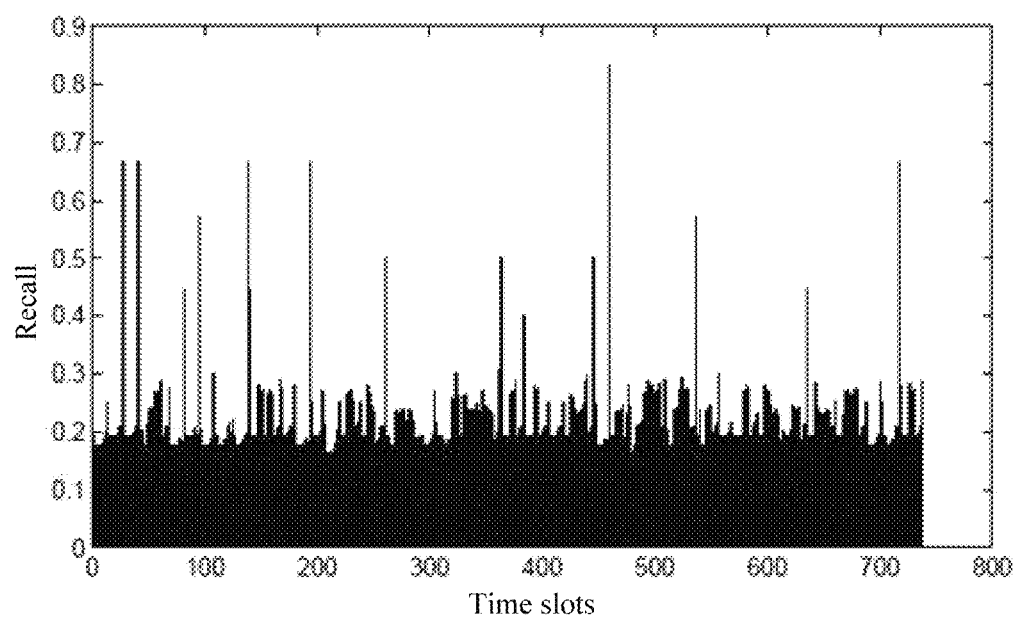
FIG. 6 is an experimental data diagram of a coflow identification effect excluding a weight learning module in the coflow identification method according to Embodiment 1 of the present application.

Similarly, to improve necessity of a weight learning module, the step of obtaining the weighted matrix by means of weight learning may be removed from the solution. As shown in FIG. 6, it may be found that a coflow identification effect of the solution is severely decreased. Therefore, effectiveness and necessity of obtaining the weighted matrix by means of weight learning can be proved.

It may be learned that in the coflow identification method in Embodiment 1 of the present application, hierarchical features of active data streams in a network are extracted, and the data streams are clustered according to the features to obtain a synergistic relationship between the data streams. Then, coflow identification accuracy is significantly improved by means of hierarchical feature extraction and weight learning.

Embodiment 2

As shown in FIG. 1, this embodiment of the present application relates to a coflow identification system, including a terminal, a slave server, and a master server.

The slave server includes one or more stream information screening modules. Each stream information screening module corresponds to a terminal and is configured to: collect data stream information of the terminal, and transmit the collected data stream information to the master server by adding the collected data stream information to header information of data streams in data transmission in a network.

In some embodiments, there may be no slave server, and the stream information screening module may be directly disposed on the master server.

Figure 8:
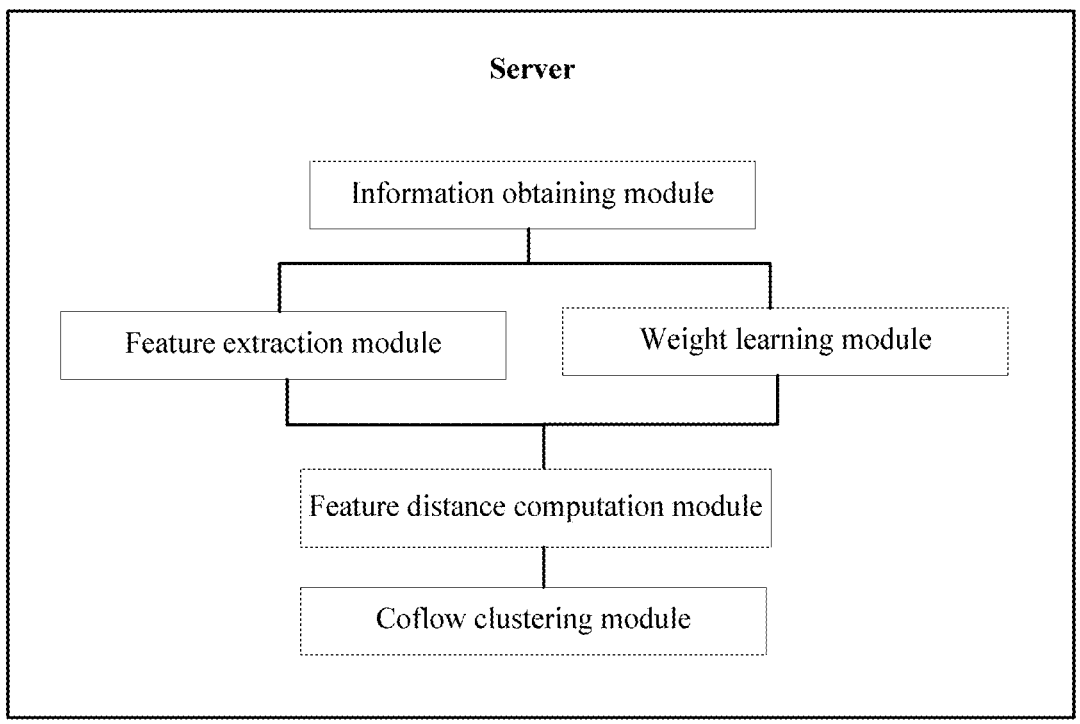
FIG. 8 is a schematic diagram of a server in a coflow identification system according to Embodiment 4 of the present application.

Referring to FIG. 8, the master server includes a stream layer data feature extraction module, an application layer data stream feature extraction module, a terminal aspect data feature extraction module, a weight learning module, a feature distance computation module, and a coflow clustering module.

The master server extracts, by using the stream layer data feature extraction module, the application layer data stream feature extraction module, and the terminal aspect data feature extraction module, a corresponding stream layer data feature, a corresponding application layer data stream feature, and a corresponding terminal aspect data feature from the header information of the data streams that is sent by the slave server.

The data stream layer data feature includes at least one of a sending time interval metric, a packet length average metric, a packet length variance metric, a packet arrival time interval average metric, a packet arrival time interval variance metric, or a transmission protocol distance metric. The application layer data stream feature includes an application layer data stream feature distance, and the application layer data stream feature distance is used to indicate a degree of overlapping between destination addresses or destination ports in the data transmission or a degree of overlapping between data transmit end IP address sets. The terminal aspect data feature includes a terminal aspect data feature distance, and the terminal aspect data feature distance is used to indicate whether the data streams belong to a same terminal cluster.

In this embodiment, manners of obtaining and computing information included in the header information of the data streams, each distance metric, and the feature distance are the same as those in the foregoing embodiment, and details are not described herein again.

The weight learning module is configured to obtain a weighted matrix by means of learning according to historical data in the network. The weighted matrix is used to minimize a feature distance between data streams belonging to a same coflow and maximize a feature distance between data streams belonging to different coflows. The feature distance is a weighted distance of at least two of the application layer data stream feature distance, the terminal aspect data feature distance, or the metrics in the data stream layer data feature. It should be particularly noted that the feature distance is a weighted distance obtained by using each of the metrics in the data stream layer data feature.

A specific learning manner and process of the weight learning module are completely the same as those in the foregoing embodiment, and details are not described herein again.

The feature distance computation module is configured to compute a feature distance between any two data streams in the network according to the metrics in the data stream layer data feature, the application layer data stream feature distance, the terminal aspect data feature distance, and the weighted matrix.

Computing manners of the feature distances are the same as those in the foregoing embodiment, and details are not described herein again.

The coflow clustering module is configured to divide the data streams in the network into several cluster sets by using a clustering algorithm and according to the feature distance between the any two data streams in the network. Each of the several cluster sets is a coflow.

The clustering algorithm, the manner, and the process are the same as those in the foregoing embodiment, and details are not described herein again.

Embodiment 3

Figure 7:
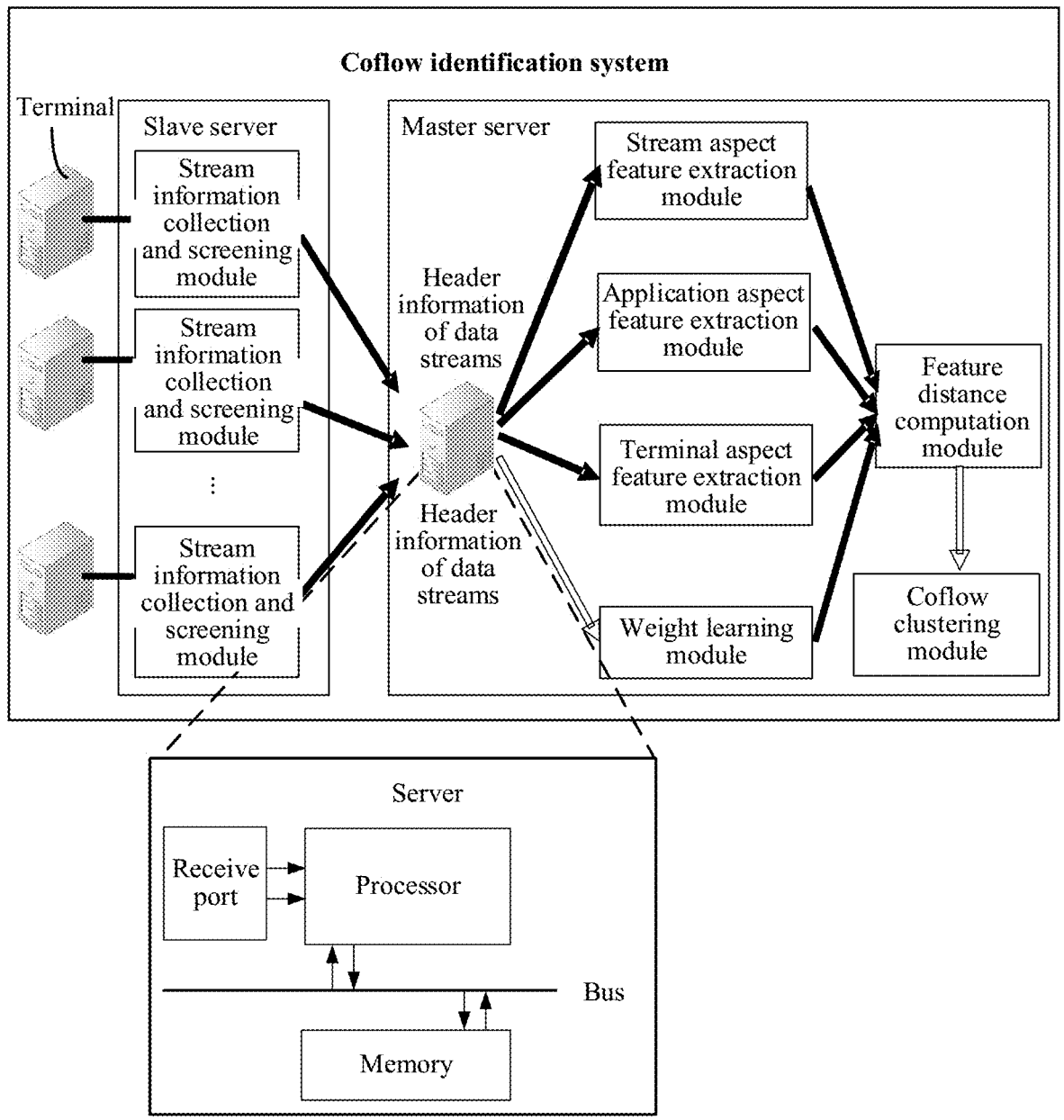
FIG. 7 is a schematic diagram of a server in a coflow identification system according to Embodiment 3 of the present application.

As shown in FIG. 7, a server provided in Embodiment 3 of the present application is configured to perform data processing in a network. The server includes a receive port, a processor, a memory, and a bus, where the bus is configured to transmit data between the receive port, the processor, and the memory;

the receive port is configured to receive header information of data streams in data transmission in the network;

the processor is configured to: obtain a stream layer data feature, an application layer data stream feature, and a terminal aspect data feature according to the header information of the data streams; obtain a weighted matrix by means of learning according to historical data in the network; compute a feature distance between any two data streams in the network according to metrics in the data stream layer data feature, the application layer data stream feature distance, the terminal aspect data feature distance, and the weighted matrix; and finally, divide the data streams in the network into several cluster sets by using a clustering algorithm and according to the feature distance between the any two data streams in the network, where each of the several cluster sets is a coflow; and the memory is configured to store the stream layer data feature, the application layer data stream feature, the terminal aspect data feature, the historical data in the network, and the weighted matrix.

The data stream layer data feature includes at least one of a sending time interval metric, a packet length average metric, a packet length variance metric, a packet arrival time interval average metric, a packet arrival time interval variance metric, or a transmission protocol distance metric. The application layer data stream feature includes an application layer data stream feature distance, and the application layer data stream feature distance is used to indicate a degree of aggregation between destination addresses or destination ports in the data transmission or a degree of overlapping between data transmit end IP address sets. The terminal aspect data feature includes a terminal aspect data feature distance, and the terminal aspect data feature distance is used to indicate whether the data streams belong to a same terminal cluster.

The weighted matrix is used to minimize a feature distance between data streams belonging to a same coflow and maximize a feature distance between data streams belonging to different coflows, and the feature distance is a weighted distance of at least two of the application layer data stream feature distance, the terminal aspect data feature distance, or the metrics in the data stream layer data feature.

The header information of the data streams includes source IP addresses of the data streams, source ports of the data streams, destination IP addresses of the data streams, destination ports of the data streams, sending time points of the data streams, and transmission protocols used by the data streams.

The processor is configured to: obtain a multi-dimensional feature distance vector according to the historical data in the network, and obtain a weighted matrix of the multi-dimensional feature distance vector by means of learning according to the historical data in the network, so as to allocate different weights by using a learning mechanism and according to different roles that feature distances of different dimensions play in coflow identification, to minimize a feature distance between data streams belonging to a same coflow and maximize a feature distance between data streams belonging to a same coflow and maximize a feature distance between data streams belonging to different coflows. The multi-dimensional feature distance vector includes at least two dimensions or at least three dimensions. The at least two dimensions correspondingly include at least two of the sending time interval metric, the packet length average metric, the packet length variance metric, the packet arrival time interval average metric, the packet arrival time interval variance metric, the transmission protocol distance metric, the application layer data stream feature distance, or the terminal aspect data feature distance. Alternatively, the at least three dimensions include the application layer data stream feature distance, the terminal aspect data feature distance, and at least one of the sending time interval metric, the packet length average metric, the packet length variance metric, the packet arrival time interval average metric, the packet arrival time interval variance metric, or the transmission protocol distance metric. Each metric or each feature distance forms a dimension of the multi-dimensional feature distance vector.

The processor is configured to compute a feature distance between any two data streams in the network according to the multi-dimensional feature distance vector and the weighted matrix.

Embodiment 4

As shown in FIG. 8, a server in Embodiment 4 of the present application is configured to identify a coflow in a data transmission process in a network.

The server includes:

an information obtaining module, configured to obtain header information of data streams in data transmission in the network and historical data in the network, where in actual application, the header information of the data streams in the data transmission in the network is collected by a data stream information collection and screening module of the server or a slave server in the network, and the information obtaining module actually obtains the header information of the data streams in the data transmission in the network by directly using the data stream information collection and screening module or obtains the header information of the data streams in the data transmission in the network by using a cache of the server;

a feature extraction module, configured to obtain a stream layer data feature, an application layer data stream feature, and a terminal aspect data feature according to the header information of the data streams, where the data stream layer data feature includes at least one of a sending time interval metric, a packet length average metric, a packet length variance metric, a packet arrival time interval average metric, a packet arrival time interval variance metric, or a transmission protocol distance metric; the application layer data stream feature includes an application layer data stream feature distance, where the application layer data stream feature distance is used to indicate a degree of aggregation between destination addresses or destination ports in the data transmission or a degree of overlapping between data transmit end IP address sets; and the terminal aspect data feature includes a terminal aspect data feature distance, where the terminal aspect data feature distance is used to indicate whether the data streams belong to a same terminal cluster;

a weight learning module, configured to obtain a weighted matrix by means of learning according to the historical data in the network, where the weighted matrix is used to minimize a feature distance between data streams belonging to a same coflow and maximize a feature distance between data streams belonging to different coflows, and the feature distance is a weighted distance of at least two of the application layer data stream feature distance, the terminal aspect data feature distance, or the metrics in the data stream layer data feature, where in actual application, the historical data in the network is generally stored in a memory of the server, and the weight learning module may obtain the historical data in the network from the memory of the server by using the information obtaining module, or may directly obtain the historical data in the network from the memory of the server;

a feature distance computation module, configured to compute a feature distance between any two data streams in the network according to the metrics in the data stream layer data feature, the application layer data stream feature distance, the terminal aspect data feature distance, and the weighted matrix; and a coflow clustering module, configured to divide the data streams in the network into several cluster sets by using a clustering algorithm and according to the feature distance between the any two data streams in the network, where a feature distance between any data stream in each aggregation flow and any other data stream in the same aggregation flow is less than a feature distance between the data stream and any data stream in a different aggregation flow, and each of the several cluster sets is a coflow.

The weight learning module is further configured to: obtain a multi-dimensional feature distance vector according to the historical data in the network, where the multi-dimensional feature distance vector includes at least three dimensions, the at least three dimensions include the application layer data stream feature distance, the terminal aspect data feature distance, and at least one of the sending time interval metric, the packet length average metric, the packet length variance metric, the packet arrival time interval average metric, the packet arrival time interval variance metric, or the transmission protocol distance metric, and each metric or each feature distance forms a dimension of the multi-dimensional feature distance vector; and then obtain a weighted matrix of the multi-dimensional feature distance vector by means of learning according to the historical data in the network, so as to allocate different weights by using a learning mechanism and according to different roles that feature distances of different dimensions play in coflow identification, to minimize a feature distance between data streams belonging to a same coflow and maximize a feature distance between data streams belonging to different coflows.

Extraction and computation of the features, obtaining of each weighted matrix, feature distance computation, similarity computation, and an aggregation method are the same as those in Embodiment 1, and details are not described herein again.

In the foregoing specific implementations, the objective, technical solutions, and beneficial effects of the present application are further described in detail. It should be understood that the foregoing descriptions are merely specific implementations of the present application, but are not intended to limit the protection scope of the present application. Any modification, equivalent replacement, or improvement made without departing from the principle of the present application should fall within the protection scope of the present application.

What is claimed is:

1. A coflow identification method for identifying a coflow in a data transmission process in a network, wherein the method comprises:

obtaining, by a server, header information of data streams in data transmission in the network, wherein the header information is header information of packets of the data streams comprising source IP addresses of the data streams, source ports of the data streams, destination IP addresses of the data streams, destination ports of the data streams, sending time points of the data streams, and transmission protocols used by the data streams;

obtaining a data stream aspect data feature, an application aspect data stream feature, and a terminal aspect data feature according to the header information of the data streams, wherein the data stream aspect data feature comprises at least one of a sending time interval metric, a packet length average metric, a packet length variance metric, a packet arrival time interval average metric, a packet arrival time interval variance metric, or a transmission protocol distance metric, wherein the transmission protocol distance metric indicates whether packet transmission protocols are the same; the application aspect data stream feature comprises an application aspect data stream feature distance, wherein the application aspect data stream feature distance is used to indicate a degree of aggregation between destination addresses or destination ports in the data transmission or a degree of overlapping between data transmit end IP address sets; and the terminal aspect data feature comprises a terminal aspect data feature distance, wherein the terminal aspect data feature distance is used to indicate whether the data streams belong to a same terminal cluster;

determining a weighted matrix based on historical data in the network, wherein the weighted matrix is used to minimize a feature distance between data streams belonging to a same coflow and maximize a feature distance between data streams belonging to different coflows, and the feature distance is a weighted distance of at least two of the application aspect data stream feature distance, the terminal aspect data feature distance, or the metrics in the data stream aspect data feature;

obtaining a multi-dimensional feature distance vector of the data streams between any two data streams in the network, wherein the multi-dimensional feature distance vector comprises at least three dimensions, the at least three dimensions comprise the application aspect data stream feature distance, the terminal aspect data feature distance, and at least one of the sending time interval metric, the packet length average metric, the packet length variance metric, the packet arrival time interval average metric, the packet arrival time interval variance metric, or the transmission protocol distance metric, and each metric or each feature distance forms a dimension of the multi-dimensional feature distance vector;

computing the feature distance between the any two data streams in the network according to the multi-dimensional feature distance vector and the weighted matrix, wherein the feature distance between the any two data streams in the network is computed according to the multi-dimensional feature distance vector and the weighted matrix by using the following computation formula:

$d(i, j) = \|f_i - f_j\|_A = \sqrt{D(i,j)^T A D(i,j)}$, wherein both $d(i, j)$ and $\|f_i - f_j\|_A$ represent a feature distance between any two data streams in the network, $D(i, j)$ is a multi-dimensional feature distance vector, $D(i, j)^T$ is a transposed matrix of the multi-dimensional feature distance vector, and A is a weighted matrix; and dividing the data streams in the network into several cluster sets by using a clustering algorithm and according to the feature distance between the any two data streams in the network, wherein a feature distance between any data stream in each aggregation flow and any other data stream in the same aggregation flow is less than a feature distance between the data stream and any data stream in a different aggregation flow, and each of the several cluster sets is a coflow, wherein an aggregation flow comprises data streams that have same destination addresses and same destination.

2. The coflow identification method according to claim 1, wherein
the sending time interval metric is an absolute value of a difference between sending time points of two data streams;
the packet length average metric is an absolute value of a difference between packet length averages of two data streams;
the packet length variance metric is an absolute value of a difference between packet length variances of two data streams;
the packet arrival time interval average metric is an absolute value of a difference between packet arrival time interval averages of two data streams;
the packet arrival time interval variance metric is an absolute value of a difference between packet transmission arrival time interval variances of two data streams; and
when the packet transmission protocols are the same, the transmission protocol distance metric is a non-zero constant, or when the packet transmission protocols are different, the transmission protocol distance metric is zero.

3. The coflow identification method according to claim 1, wherein the obtaining a weighted matrix by means of learning according to historical data in the network comprises:
obtaining a multi-dimensional feature distance vector according to the historical data in the network, wherein the multi-dimensional feature distance vector comprises at least three dimensions, the at least three dimensions comprise the application aspect data stream feature distance, the terminal aspect data feature distance, and at least one of the sending time interval metric, the packet length average metric, the packet length variance metric, the packet arrival time interval average metric, the packet arrival time interval variance metric, or the transmission protocol distance metric, and each metric or each feature distance forms a dimension of the multi-dimensional feature distance vector; and
determining a weighted matrix of the multi-dimensional feature distance vector based on the historical data in the network, so as to allocate different weights according to different importance that feature distances of different dimensions play in coflow identification, to minimize a feature distance between data streams belonging to a same coflow and maximize a feature distance between data streams belonging to different coflows.

4. The coflow identification method according to claim 3, wherein the determining a weighted matrix of the multi-dimensional feature distance vector comprises:
dividing historical data streams in the network into two data stream pair sets according to whether the historical data streams belong to a same coflow, wherein the two data stream pair sets respectively correspond to a coflow data set and a non-coflow data set; and
finding a positive semi-definite matrix A that minimizes a computation result of a target function $$\min_A \sum_{(f_i, f_j) \in S} \|f_i - f_j\|_A^2 - \log\left(\sum_{(f_i, f_j) \in D} \|f_i - f_j\|_A\right)$$

s.t. $A \phi 0$, wherein
$\|f_i - f_j\|_A$ represents a feature distance between any two data streams, $\|f_i - f_j\|_A = \sqrt{D(i,j)^T A D(i,j)}$, $D(i, j)$ is a multi-dimensional feature distance vector, $D(i, j)^T$ is a transposed matrix of the multi-dimensional feature distance vector, and A is a weighted matrix.

5. The coflow identification method according to claim 1, wherein the obtaining an application aspect data stream feature comprises:
clustering the data streams according to the source IP addresses and finding all aggregation flows in the network;
finding a source IP address set of the aggregation flows;
for data streams belonging to a same aggregation flow, directly assigning a value to the application aspect feature distance; and
for data streams not belonging to a same aggregation flow, computing a Jacard similarity and computing the application aspect feature distance.

6. The coflow identification method according to claim 1, wherein the obtaining a terminal aspect data feature according to the header information of the data streams comprises:
periodically obtaining traffic attribute information of the network, wherein the traffic attribute information comprises at least two of a terminal traffic mode, data traffic of a terminal within a period of time, or a quantity of data streams of a terminal within a period of time;
constructing a weighted traffic matrix according to the obtained traffic attribute information of the network, to distinguish different importance and weights of the terminal traffic mode, the data traffic of a terminal within a period of time, and the quantity of data streams of a terminal within a period of time during computation of a terminal cluster, the data traffic of a terminal within a period of time, or the quantity of data streams of a terminal within a period of time;
obtaining information about the terminal cluster in the network according to the weighted traffic matrix by using a spectral clustering algorithm; and
determining, according to whether the data streams belong to a same terminal cluster, a terminal aspect data feature distance between any two active data streams in a terminal cluster aspect in the current network.

7. The coflow identification method according to claim 6, wherein the constructing a weighted traffic matrix comprises:
periodically obtaining data stream information of the network within a period of time T from a data stream information collection and screening module, and computing a weighted traffic matrix within the period of time, wherein a computation formula is as follows:

$M(i,j)=V(i,j) \times N(i,j)$, wherein $M \in R^{n \times n}$ represents traffic modes of n terminals in the network, n is an integer greater than 1, V(i, j) represents traffic of any terminal pair (i, j) within the period of time, N(i, j) represents a quantity of data streams of the any terminal pair (i, j) formed by an $i^{th}$ terminal and a $j^{th}$ terminal within the period of time, and i and j are not equal and are integers greater than 1.

8. A server for identifying a coflow in a data transmission process in a network, comprising:
a processor;
a memory containing computer instructions for execution by the processor wherein that prompts the processor to be configured to include an information obtaining module, a feature extraction module, a weight learning module, a feature distance computation module, and a coflow clustering module, wherein the information obtaining module is configured to obtain header information of data streams in data transmission in a network and historical data in the network, wherein the header information is header information of packets of the data streams comprising source IP addresses of the data streams, source ports of the data streams, destination IP addresses of the data streams, destination ports of the data streams, sending time points of the data streams, and transmission protocols used by the data streams;
the feature extraction module extracts a data stream aspect data feature, an application aspect data stream feature, and a terminal aspect data feature from the header information of the data streams, wherein the data stream aspect data feature comprises at least one of a sending time interval metric, a packet length average metric, a packet length variance metric, a packet arrival time interval average metric, a packet arrival time interval variance metric, or a transmission protocol distance metric; the application aspect data stream feature comprises an application aspect data stream feature distance, wherein the transmission protocol distance metric indicates whether packet transmission protocols are the same, the application aspect data stream feature distance is used to indicate a degree of aggregation between destination addresses or destination ports in the data transmission or a degree of overlapping between data transmit end IP address sets, wherein the terminal aspect data feature comprises a terminal aspect data feature distance, wherein the terminal aspect data feature distance is used to indicate whether the data streams belong to a same terminal cluster, wherein an terminal cluster comprises at least two terminals having a common attribute of terminal traffic mode;
the weight learning module is configured to determine a weighted matrix based on the historical data in the network, wherein the weighted matrix is used to minimize a feature distance between data streams belonging to a same coflow and maximize a feature distance between data streams belonging to different coflows, and the feature distance is a weighted distance of the data stream aspect data feature, the application aspect data stream feature, and the terminal aspect data feature;
the feature distance computation module is configured to obtain a multi-dimensional feature distance vector of the data streams between any two data streams in the network, wherein the multi-dimensional feature distance vector comprises at least three dimensions, the at least three dimensions comprise the application aspect data stream feature distance, the terminal aspect data feature distance, and at least one of the sending time interval metric, the packet length average metric, the packet length variance metric, the packet arrival time interval average metric, the packet arrival time interval variance metric, or the transmission protocol distance metric, and each metric or each feature distance forms a dimension of the multi-dimensional feature distance vector; and compute the feature distance between the any two data streams in the network according to the multi-dimensional feature distance vector and the weighted matrix, wherein the feature distance between the any two data streams in the network is computed according to the multi-dimensional feature distance vector and the weighted matrix by using the following computation formula:

$d(i, j)=\|f_i-f_j\|_A=\sqrt{D(i,j)^T A D(i,j)}$, wherein both $d(i, j)$ and $\|f_i-f_j\|_A$ represent a feature distance between any two data streams in the network, D(i, j) is a multi-dimensional feature distance vector, $D(i, j)^T$ is a transposed matrix of the multi-dimensional feature distance vector, and A is a weighted matrix; and the coflow clustering module is configured to divide the data streams in the network into several cluster sets by using a clustering algorithm and according to the feature distance between the any two data streams in the network, wherein a feature distance between any data stream in each aggregation flow and any other data stream in the same aggregation flow is less than a feature distance between the data stream and any data stream in a different aggregation flow, and each of the several cluster sets is a coflow, wherein an aggregation flow comprises data streams that have same destination addresses and same destination.

9. The server according to claim 8, wherein the weight learning module is specifically configured to: obtain a multi-dimensional feature distance vector according to the historical data in the network, and obtain a weighted matrix of the multi-dimensional feature distance vector by means of learning according to the historical data in the network, so as to allocate different weights by using a learning mechanism and according to different importance that feature distances of different dimensions play in coflow identification, to minimize a feature distance between data streams belonging to a same coflow and maximize a feature distance between data streams belonging to different coflows, wherein the multi-dimensional feature distance vector comprises at least three dimensions, the at least three dimensions correspondingly comprise the application aspect data stream feature distance, the terminal aspect data feature distance, and at least one of the sending time interval metric, the packet length average metric, the packet length variance metric, the packet arrival time interval average metric, the packet arrival time interval variance metric, or the transmission protocol distance metric, and each metric or each feature distance forms a dimension of the multi-dimensional feature distance vector.

\* \* \* \* \*